US006993024B1

(12) United States Patent
McDermott, III et al.

(10) Patent No.: US 6,993,024 B1
(45) Date of Patent: Jan. 31, 2006

(54) SYSTEM AND METHOD FOR ROUTER MULTICAST CONTROL

(75) Inventors: Thomas C. McDermott, III, Plano, TX (US); Jim Kleiner, Dallas, TX (US)

(73) Assignee: Chiaro Networks, Ltd., Richardson, TX (US)

( * ) Notice: Subject to any disclaimer, the term of this patent is extended or adjusted under 35 U.S.C. 154(b) by 830 days.

(21) Appl. No.: 09/714,426

(22) Filed: Nov. 16, 2000

(51) Int. Cl.
H04J 1/00 (2006.01)

(52) U.S. Cl. .................. 370/390; 370/432; 370/401

(58) Field of Classification Search ........... 370/389, 370/390, 395.1, 398, 395.5, 395.51, 400, 370/428, 401, 391, 427, 388, 369, 465, 235, 370/432, 419, 392, 466, 412, 463, 420; 398/54, 398/79
See application file for complete search history.

(56) References Cited

U.S. PATENT DOCUMENTS

| | | | | |
|---|---|---|---|---|
| 5,179,551 A | * | 1/1993 | Turner .................. | 370/398 |
| 5,301,055 A | * | 4/1994 | Bagchi et al. .......... | 398/54 |
| 5,305,311 A | * | 4/1994 | Lyles ................... | 370/390 |
| 5,497,369 A | * | 3/1996 | Wainwright ............ | 370/390 |
| 5,608,726 A | * | 3/1997 | Virgile ................. | 370/401 |
| 5,835,491 A | * | 11/1998 | Davis et al. ............ | 370/386 |
| 5,909,438 A | * | 6/1999 | Melden et al. ......... | 370/388 |
| 5,963,552 A | * | 10/1999 | Joo et al. .............. | 370/395.32 |
| 6,292,485 B1 | * | 9/2001 | Trotta et al. ........... | 370/389 |
| 6,331,983 B1 | * | 12/2001 | Haggerty et al. ....... | 370/400 |
| 6,349,097 B1 | * | 2/2002 | Smith .................. | 370/390 |
| 6,417,944 B1 | * | 7/2002 | Lahat et al. ........... | 398/79 |
| 6,487,171 B1 | * | 11/2002 | Honig et al. ........... | 370/235 |
| 6,553,030 B2 | * | 4/2003 | Ku et al. .............. | 370/390 |
| 6,661,788 B2 | * | 12/2003 | Angle et al. ........... | 370/390 |
| 6,760,332 B1 | * | 7/2004 | Vladescu et al. ....... | 370/395.1 |
| 2002/0093952 A1 | * | 7/2002 | Gonda .................. | 370/369 |

FOREIGN PATENT DOCUMENTS

EP 0 779 761 6/1997

OTHER PUBLICATIONS

U.S. Appl. No. 09/703,057, filed Oct. 31, 2000, Tony M. Brewer et al.
U.S. Appl. No. 09/703,056, filed Oct. 31, 2000, Tony M. Brewer et al.
U.S. Appl. No. 09/703,038, filed Oct. 31, 2000, Tony M. Brewer et al.
U.S. Appl. No. 09/702,958, filed Oct. 31, 2000, Tony M. Brewer et al.
U.S. Appl. No. 09/703,027, filed Oct. 31, 2000, Harry C. Blackmon et al.

(Continued)

Primary Examiner—Brian Nguyen
(74) Attorney, Agent, or Firm—Fulbright & Jaworski LLP

(57) ABSTRACT

A multicast packet is transferred through a switching fabric from an input line card to a dedicated multicast card, which is substantially the same as an input and output line card, but without external facility interfaces. A dedicated output multicast card converts the multicast packet from an optical to an electrical packet and passes it to a dedicated input multicast card, where the packet is replicated electrically, converted back to an optical packet, and then transferred through the switching fabric to multiple destinations. In some embodiments, input and output dedicated multicast cards are actually a single card. Transfer of the multicast packet to multiple destinations occurs sequentially or simultaneously during a single switching cycle, if multiple parallel switching paths exist through the switching fabric. Some embodiments include multiple dedicated multicast cards, allowing rapid simultaneous expansion of the multicast tree.

6 Claims, 2 Drawing Sheets

OTHER PUBLICATIONS

U.S. Appl. No. 09/703,043, filed Oct. 31, 2000, Harry C. Blackmon et al.

U.S. Appl. No. 09/703,064, filed Oct. 31, 2000, Thomas C. McDermott III et al.

Gipser, Thilo, "Broadcasting in an All-Optical Packet-Switched Network," Communication Technology Laboratory, Swiss Federal Institute of Technology, Zurich, Jun. 23, 1996, pp. 192-197.

Sahasrabuddhe, Laxman H., and Mukherjee, Biswanath, "Light-Trees: Optical Multicasting for Improved Performance in Wavelength-Routed Networks," IEEE Communication Magazine, Feb. 1999, pp. 67-73.

European Search Report issued for EP 01 30 9610, dated Jun. 4, 2004.

D. X. Chen, et al., "SCOQ: A Fast Packet Switch With Shared Concentration and Output Queueing," IEEE/ACM Transactions of Networking, vol. 1, No. 1 Feb. 1993, pp. 142-151.

* cited by examiner

SYSTEM AND METHOD FOR ROUTER MULTICAST CONTROL

RELATED APPLICATIONS

This application is related to co-pending and commonly assigned U.S. application Ser. No. 09/703,057, entitled "system And Method For IP Router With an Optical Core," to co-pending and commonly assigned U.S. application Ser. No. 09/703,056, entitled "System and Method for Router Central Arbitration," to co-pending and commonly assigned U.S. application Ser. No. 09/703,038, entitled "System and Method for Router Data Aggregation and Delivery," to co-pending and commonly assigned U.S. application Ser. No. 09/702,958, entitled "Timing and Synchronization for an IP Router Using an Optical Switch," now issued as U.S. Pat. No. 6,711,357 to co-pending and commonly assigned U.S. application Ser. No. 09/703,027, entitled "Router Network Protection Using Multiple Facility Interfaces," to co-pending and commonly assigned U.S. application Ser. No. 09/703,043, entitled "Router Line Card Protection Using One-for-N Redundancy" now issued as U.S. Pat. No. 6,879,559, and to co-pending and commonly assigned U.S. application Ser. No. 09/703,064, entitled "Router Switch Fabric Protection Using Forward Error Correction," now issued as U.S. Pat. No. 6,894,970, all filed Oct. 31, 2000, the disclosures of which are incorporated herein by reference.

TECHNICAL FIELD

This application relates to the field of optical communication networks, and particularly to large-scale routers for optical communication networks.

BACKGROUND

Routers with electronic switch fabrics have the ability to store data packets and then make multiple copies of those packets. In one approach, for example, a packet is copied into an electronic fabric and each output card reads the same copy of that packet. When all of the outputs have read the packet, it can be discarded. Thus the fabric itself is capable of performing a multicast operation, in which one input packet is cloned and copied to multiple outputs.

A router switch fabric that has no inherent storage or replication capability, for example an optical switch fabric, cannot fundamentally multicast packets. There are other approaches that, for example, store a packet on an input line card in electronic form and have the input line card make multiple copies of the packet, sending them to each multicast output as necessary. Although this will function and perform the multicast operation, a drawback is that the packet sits in memory on the input card, and if sufficient numbers of multicast packets arrive, the memory on the input card can be exhausted, or the memory can back up subsequent nonmulticast packets and delay or block them from getting through the switching fabric.

SUMMARY OF THE INVENTION

The present invention is directed to a system and method to transfer a multicast packet out of an input card which may have unicast as well as multicast traffic coming into it, and to remove the multicast packet to a dedicated multicast card. The dedicated multicast card is then responsible for replicating multiple copies of that packet to the various multicast outputs. This approach is applicable to router switching fabrics, for example optical switch fabrics, that have no inherent packet storage or replication capability. A dedicated multicast card is substantially the same kind of card as an input and output line card, but without external facility interface connections.

In an embodiment of the present invention an incoming multicast packet is transferred through the router switching fabric to a dedicated output multicast card substituting for an ordinary output line card, which then converts the packet from an optical packet to an electrical packet and passes it to a dedicated input multicast card substituting for a conventional input line card. There the packet is stored and can be replicated electrically, converted back to an optical packet, and transferred through the router switching fabric to multiple destination output line cards. In a preferred embodiment, the input and output dedicated multicast cards are in reality the same dedicated multicast card.

Transfer of the multicast packet to multiple destinations can occur sequentially over multiple switching cycles or can occur simultaneously. In some embodiments the switching fabric is subdivided into multiple subplanes, such that multiple parallel switching paths exist through the switching fabric. This enables simultaneous parallel multicasting to multiple destinations during a single switching cycle. Some embodiments of the present invention include multiple dedicated multicast cards. This configuration allows rapid expansion of the multicast tree to a large number of destinations.

Various aspects of the invention are described in co-pending and commonly assigned U.S. application Ser. No. 09/703,057, entitled "System And Method For IP Router With an Optical Core," co-pending and commonly assigned U.S. application Ser. No. 09/703,056, entitled "System and Method for Router Central Arbitration," co-pending and commonly assigned U.S. application Ser. No. 09/703,038, entitled "System and Method for Router Data Aggregation and Delivery." co-pending and commonly assigned U.S. application Ser. No. 09/702,958, entitled "Timing and Synchronization for an IP Router Using an Optical Switch," now issued as U.S. Pat. No. 6,711,357, co-pending and commonly assigned U.S. application Ser. No. 09/703,027, entitled "Router Network Protection Using Multiple Facility Interfaces," co-pending and commonly assigned U.S. application Ser. No. 09/703,043, entitled "Router Line Card Protection Using One-for-N Redundancy" now issued as U.S. Pat. No. 6,879,559, co-pending and commonly assigned U.S. application Ser. No. 09/703,064, entitled "Router Switch Fabric Protection Using Forward Error Correction," now issued as U.S. Pat. No. 6,894,970, all filed Oct. 31, 2000, the disclosures of which are incorporated herein by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
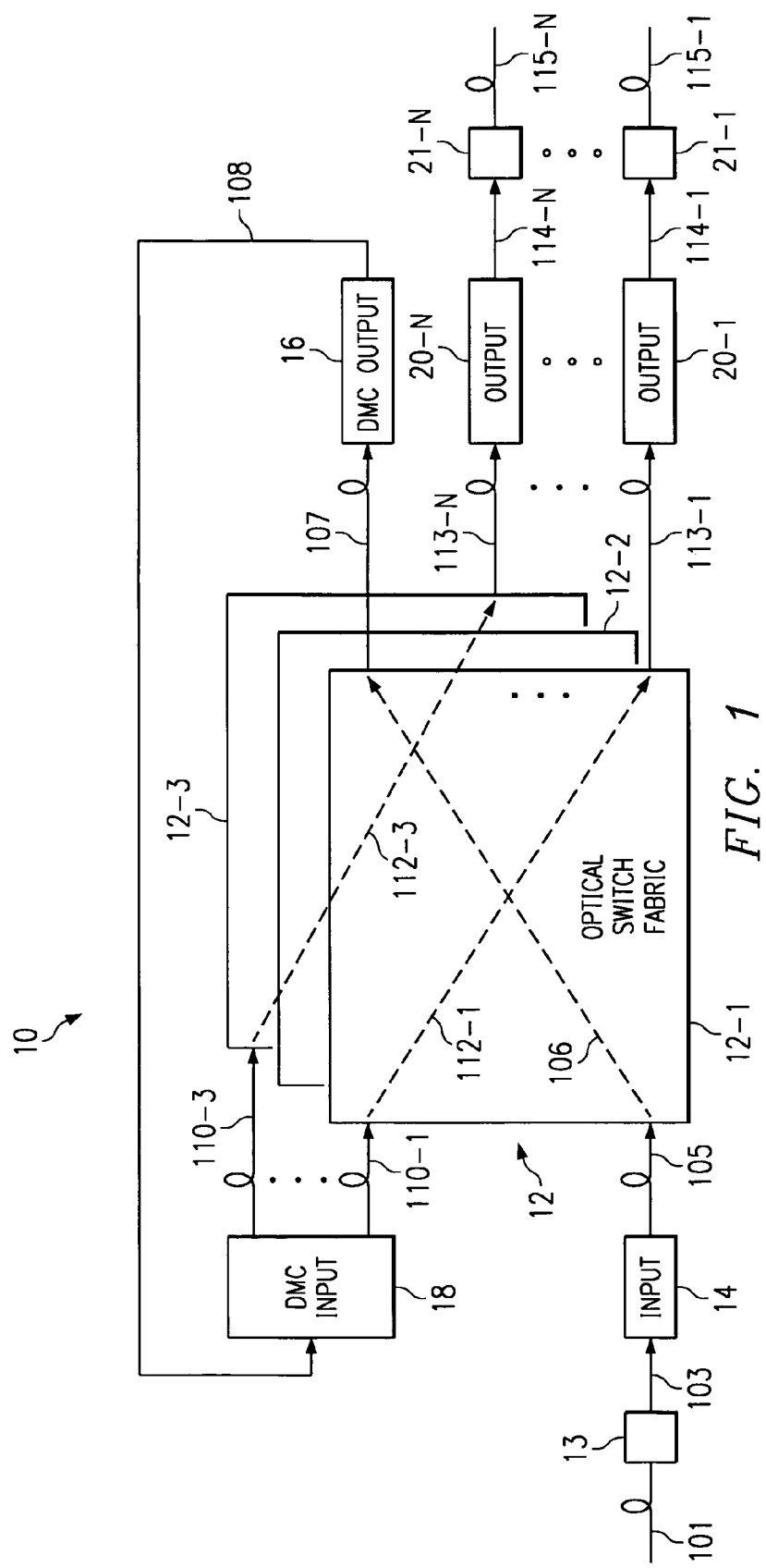
FIG. 1 is a block diagram illustrating multicast data packet flow through a router system having an optical switching fabric, in accordance with an embodiment of the present invention.

FIG. 1 is a block diagram illustrating multicast data packet flow through a router system 10 having an optical switching fabric 12, in accordance with an embodiment of the present invention. Optical switching fabric 12 can be partitioned into multiple switching subplanes, for example subplanes 12-1 through 12-3, each having multiple inputs and outputs, which are interconnected dynamically in input/output pair configurations through the optical switch, for example through switching paths 106 and 112-1 through 112-3. The inputs of optical switching fabric 12 are interconnected with multiple input line cards, represented for clarity in FIG. 1 by input line card 14 interconnected through optical link 105 with optical switching fabric 12. Each input line card 14 is in turn interconnected through an electrical link 103 with an input facility interface card 13. Input facility interface card 13 is connected through optical input data path 101 with other network systems, for example peer routers. The outputs of optical switching fabric 12 are interconnected with multiple output line cards, represented for clarity by output line cards 20-1 through 20-N interconnected with optical switching fabric 12 through optical links 113-1 through 113-N. Output line cards 20-1 through 20-N are further interconnected through electrical links 114-1 through 114-N with respective output facility interface cards 21-1 through 21-N, which in turn are connected through respective optical output data paths 115-1 through 115-N with other systems across the network.

In the present embodiment, a dedicated output multicast card 16 is interconnected through an optical link 107 with an output of optical switch fabric 12. Likewise, a dedicated input multicast card 18 is interconnected through an optical link 110-1 with an input of optical switch fabric 12. Dedicated multicast cards 16 and 18 are substantially the same type of cards as respective input line card 14 and output line cards 20-1 through 20-N, but without external facility interface connections. Dedicated multicast cards 16 and 18 are connected together through a data loop 108.

When a packet destined to be multicast (a "multicast packet") arrives at an input line card 14, the packet header destination is decoded and the multicast packet is accordingly forwarded through optical links 105 and 107 and through optical switch fabric 12 along switching path 106 to dedicated output multicast card 16. Dedicated output multicast card 16 converts the optical multicast packet to an electrical multicast packet, which is looped back to dedicated input multicast card 18 through data loop 108. Dedicated input multicast card 18 then converts the multicast packet back to an optical multicast packet, which it forwards through optical link 110-1 and along a switching path 112-1 to an output line card 20-1 interconnected with a destination optical switch output through an optical link 113-1. At output line card 20-1 the multicast packet is handled in the same fashion as any other data packet arriving at output line card 20-1.

A system and method for a network router with an optical switching fabric is described in U.S. application Ser. No. 09/703,057, cited above. Although for the purpose of clarity corresponding input and output functions are shown on separate circuit cards in separate ½ line shelves, embodiments are described in which corresponding input and output functions are combined on a single circuit card in a single line shelf combining ½ input and output line shelves, thus creating a folded router system configuration. Particularly, input and output packet forwarding line cards can be combined into a single physical circuit card in a single line shelf. In this folded system configuration, dedicated output multicast card 16 and dedicated input multicast card 18 are in fact the same circuit card, and data loop 108 can become simply a conductive trace on that single circuit card.

Once the multicast packet is removed from the original input line card 14, it no longer sits in memory on the input line card, and thus no longer delays or blocks ordinary network traffic. In some embodiments dedicated multicast card 16, 18 makes multiple replicas of a multicast packet and then forwards these replicas through optical switch fabric 12 to multiple switch destinations connected with multiple output line cards 20-1 through 20-N. These replica multicast packets can be forwarded serially during separate switch cycles.

Alliteratively, replica multicast packets can be forwarded simultaneously within one switch cycle to multiple destinations, provided that optical switch fabric 12 incorporates m multiple switching subplanes, for example subplanes 12-1 through 12-3, that support m multiple parallel switching paths, illustrated schematically by switching paths 112-1 through 112-3. In the router system described in U.S. application Ser. No. 09/703,057, cited above, for example, a multiple subplane switch fabric architecture supports simultaneous parallel switching paths. This structure allows sending two or more multicast replica packets in parallel simultaneously from one dedicated input multicast card 18 through switch fabric 12 to multiple destination output line cards 20-1 through 20-N along separate paths, for example a path through link 110-1 and then through switching path 112-1 and a separate path through link 110-3 and then through switching path 112-3. If the required multicast output size were six, for example, one multicast packet could be sent from input line card 14 to a dedicated multicast card 16, 18, which could replicate the packet and transmit up to three multicast replicas in parallel to three destination output line cards, for example output line cards 20-1 through 20-3, during one switch cycle, and then during a subsequent switch cycle transmit another three multicast replicas in parallel to three additional destination output line cards, for example output line cards 20-4 through 20-6. This multicast operation requires three switch cycles, namely one cycle to send the original multicast packet from the input line card to the dedicated multicast card, and two additional cycles to transmit multicast replicas to the six destinations at three replicas per cycle. Because the first cycle is pipelined, the actual delay is two cycles.

The number of times t that a multicast packet is sent through the switch fabric is given by an expression $$t = 1 + \text{CEILING}\left(\frac{N}{m}\right)$$

one time to go from the input line card to the dedicated multicast card and then $$\text{CEILING}\left(\frac{N}{m}\right)$$

times, where N is the number of destination line cards, m is the number of simultaneous parallel switching paths, and the CEILING function rounds up a value to the next larger integer.

Figure 2:
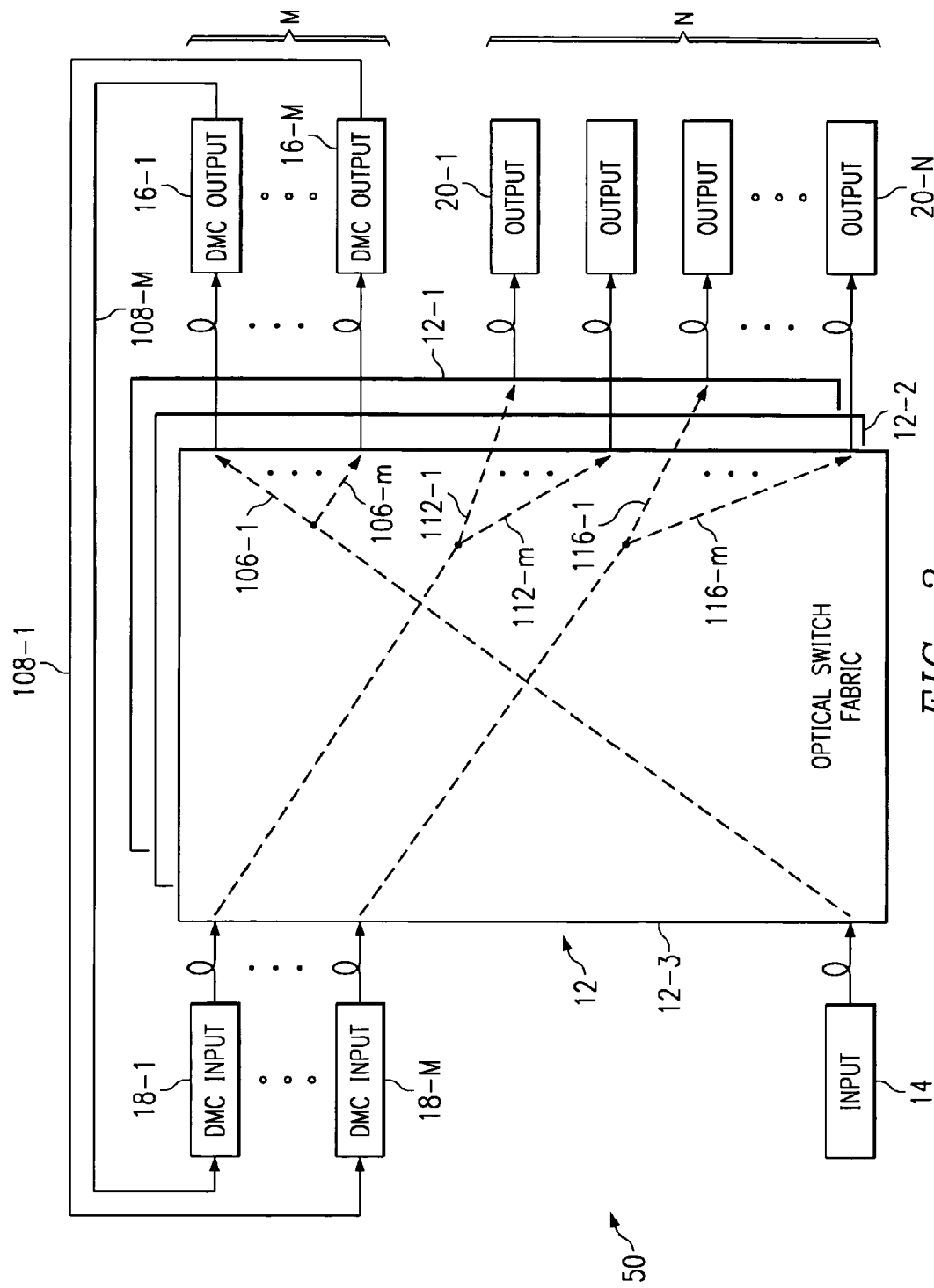
FIG. 2 is a block diagram illustrating a router embodiment that includes multiple dedicated multicast cards.

FIG. 2 is a block diagram illustrating a router embodiment 50 that includes M multiple dedicated multicast cards 16-1 through 16-M and 18-1 through 18-M. Switch fabric 12 is partitioned into m multiple subplanes, for example subplanes 12-1 through 12-3, thus supporting m multiple simultaneous switching paths, for example switching paths 106-1 through 106-m, 112-1 through 112-m, and 116-1 through 116-m. In a folded router geometry, multicast cards 16-1 and 18-1, and connecting data loop 108-1 occupy a single circuit card. Similarly multicast cards 16-M and 18-M and connecting data loop 108-M occupy a single circuit card. In the example of FIG. 2, a multicast packet is sent by input line card 14 simultaneously through parallel switching paths 106-1 through 106-m across switch fabric 12 to M dedicated multicast cards 16-1, 18-1 through 16-M, 18-M, where the packet is replicated at each multicast card and then sent in m parallel replica packets from each dedicated multicast card 16-1, 18-1 through 16-M, 18-M through simultaneous switching paths 112-1 through 112-m and 116-1 through 116-m respectively across switch fabric 12 to N destination line cards 20-1 through 20-N. This multiple replication provides a one-to-N multicast tree expansion. If two dedicated multicast cards 16-M, 18-M can each send three replica packets, then three replicas multiplied by two multicast cards would provide one-to-six multicast tree expansion. This procedure improves the fan out and reduces the time delay, since more data is multicast within a single switch cycle.

In the more general case with N multiple output destinations, M multiple dedicated multicast cards, and m simultaneous parallel switching paths, the number of times t that a multicast packet goes through the switch fabric is given by an expression $$t = \text{CEILING}\left(\frac{M}{m}\right) + \text{CEILING}\left(\frac{N}{mM}\right),$$

where variables and functions are as defined above. If for example M=2, m=3, and N=100, then t=18 switch cycles, whereas if M=5, m=3, and N=100, then t=9 switch cycles, which is only half of the previously calculated delay. The m parallel switching paths limited by the subplane structure of the switch fabric refer only to those paths that originate from a common input, for example either a common input line card or a common dedicated multicast input card. The M different multiple dedicated multicast cards can be increased independent of this limitation. The M different multiple dedicated multicast cards can then each originate a set of m simultaneous parallel switching paths through the switch fabric. Since adding a dedicated multicast card is a lower cost option than adding a switch subplane, multiple dedicated multicast cards provide an advantageous approach to increasing the multicast tree expansion with minimum switch cycle delay.

This means that for example in FIG. 2, one input line card 14 could send a multicast packet simultaneously to M different dedicated multicast cards, which then could perform multiple replication. Thus, the number of multicast cards times the number of available simultaneous parallel switching paths expands the multicast tree for a single switch cycle. This affords the flexibility to install as many multicast cards as is necessary to support the required multicast tree expansion, with an option to install fewer if desired.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of multicasting a data packet from a single input to multiple outputs of a router system having a switching fabric, comprising:
   transferring the data packet to be multicast (multicast packet) from a router input to a dedicated multicast output card;
   transferring said multicast packet from said dedicated multicast output card to a dedicated multicast input card;
   storing said multicast packet on said dedicated multicast input card; and
   transferring said stored multicast packet from said dedicated multicast input card to said multiple outputs of said router system, wherein said multicast packet is replicated to produce a replica packet, wherein said switching fabric contains multiple inputs and said multiple outputs connected through multiple parallel switching paths, wherein multiple replica packets are transferred in parallel to said multiple outputs during a single cycle of said switching fabric, and wherein said multicast packet is sent through said switching fabric $$1 + \text{CEILING}\left(\frac{N}{m}\right)$$

times wherein N is the quantity of said multiple outputs, wherein m is the quantity of said multiple parallel switching paths, and wherein the CEILING function rounds the value of a variable up to the next higher integer.

2. The method of claim 1, wherein said dedicated multicast output card and said dedicated multicast input card are combined into a single dedicated multicast card.

3. The method of claim 1 wherein said replica packet is produced at a location selected from the group consisting of said dedicated multicast output card and said dedicated multicast input card.

4. The method of claim 1 wherein said multicast packet is converted from an electrical packet to an optical packet at said dedicated multicast input card.

5. The method of claim 1 wherein said multicast packet is transferred from said dedicated multicast input card to said multiple outputs through said switching fabric.

6. A method of multicasting a data packet from a single input to multiple outputs of a router system having a switching fabric, comprising:
   transferring the data packet to be multicast (multicast packet) from a router input to a dedicated multicast output card;
   transferring said multicast packet from said dedicated multicast output card to a dedicated multicast input card;
   storing said multicast packet on said dedicated multicast input card; and
   transferring said stored multicast packet from said dedicated multicast input card to said multiple outputs of said router system, wherein said multicast packet is transferred to said dedicated multicast output card through said switching fabric, wherein said multicast packet is transferred substantially simultaneously to a plurality of dedicated multicast output cards through said switching fabric, wherein said multicast packet is transferred from a plurality of dedicated multicast input cards to said multiple outputs through said switching fabric, wherein said switching fabric contains multiple inputs and said multiple outputs connected through multiple parallel switching paths, wherein said multicast packet is replicated to produce a replica packet, wherein multiple replica packets are transferred substantially simultaneously in parallel from said plurality of dedicated multicast input cards to said multiple outputs during a single switching cycle of said switching fabric, and wherein said multicast packet is sent through said switching fabric $$\text{CEILING}\left(\frac{N}{m}\right) + \text{CEILING}\left(\frac{N}{mM}\right)$$

times, wherein N is the quantity of said multiple outputs, wherein M is the quantity of said plurality of dedicated multicast cards, wherein m is the quantity of said multiple parallel switching paths, and wherein the CEILING function rounds the value of a variable up to the next higher integer.

* * * * *